United States Patent [19]

Tamura et al.

[11] Patent Number: 4,555,146
[45] Date of Patent: Nov. 26, 1985

[54] TRACK-TYPE VEHICLE UNDERCARRIAGE

[75] Inventors: Yukio Tamura; Masashi Kaminishi, both of Hiratsuka

[73] Assignee: Kabushiki Kaisha Komatsu Seisakusho, Tokyo, Japan

[21] Appl. No.: 476,510

[22] Filed: Mar. 18, 1983

[51] Int. Cl.[4] .............................................. B62D 55/12
[52] U.S. Cl. ...................................... 305/10; 305/22; 305/31
[58] Field of Search ......... 305/17, 18, 22, 24, 305/25, 27, 16, 10, 31, 32, 57

[56] References Cited

U.S. PATENT DOCUMENTS

| | | | |
|---|---|---|---|
| 1,394,996 | 10/1921 | Holt | 305/31 |
| 1,407,972 | 2/1922 | Wickersham | 305/17 |
| 1,520,416 | 12/1924 | Holt | 305/25 |
| 2,125,531 | 8/1938 | Weeks | 305/31 |
| 3,155,436 | 11/1964 | Bonmartini | 305/25 |
| 3,338,325 | 8/1967 | Morse | 305/57 |
| 4,191,431 | 3/1980 | Roley et al. | 305/18 |
| 4,402,555 | 9/1983 | Ogaki et al. | 305/57 |

Primary Examiner—Trygve M. Blix
Assistant Examiner—Edwin L. Swinehart
Attorney, Agent, or Firm—Armstrong, Nikaido, Marmelstein & Kubovcik

[57] ABSTRACT

A track-type vehicle undercarriage comprising a track frame, a lower rail fixedly secured to the track frame underneath thereof, a recoil device mounted on the track frame, a support member fixedly connected to the recoil device and biased forwardly thereby, an idler rotatably mounted on the support member, a sprocket, and an endless track of linked together track shoes mounted around the lower rail, idler and sprocket. A front support rail and a rear support rail are mounted on the track frame adjacent to the idler and sprocket, respectively, to permit a smooth travel of the endless track of linked together track shoes.

3 Claims, 6 Drawing Figures

TRACK-TYPE VEHICLE UNDERCARRIAGE

BACKGROUND OF THE INVENTION

This invention relates to a track type vehicle undercarriage.

In the undercarriage of the kind specified, a track link chain extends round an idler and a sprocket mounted, respectively, on the front and rear parts of a track frame, and the track link chain is provided with track rollers adapted to roll along rails located in the lower part of the track frame, and further a semi-circular front rail is installed in the vicinity of the idler.

In such a construction, however, when the rollers ride on the front rail shock noise will occur causing a problem with noise, and also when the rollers move rearwardly so as to mesh with the sprocket, the rollers will strike against the bottom of the teeth of the sprocket thereby generating a loud shock noise.

In order to solve this problem, there has been proposed a system wherein upper rails extend round the sprocket and the idler to prevent the rollers from striking against the sprocket.

However, this construction is disadvantageous in that when the rollers roll along the upper rails the rotary resistance becomes larger than the roller turning force with the result that the rollers will slidably move along the upper rails thus causing early wear of both the rollers and upper rails so as to reduce the durability thereof, and also because the rollers continue to rotate when they pass through the upper rails, the service life of the rotating support parts of the rollers, in particular, the floating seals will be reduced.

SUMMARY OF THE INVENTION

It is therefore an object of the present invention to provide an improved track-type vehicle undercarriage which is simple in construction and can reduce wear and noise factors generally associated with such undercarriages.

Another object of the present invention is to provide an improved track-type vehicle undercarriage having a plurality of track rollers mounted on an endless track of linked together track shoes wherein a smooth travel of the endless track and reduction of striking noise are effected.

In accordance with an aspect of the present invention, there is provided a track-type vehicle undercarriage, comprising: a track frame; recoil means mounted on said track frame, said recoil means having a piston slidably mounted therein and means for biasing said piston forwardly; a support member fixedly connected to said piston; an idler rotatably mounted on said support member at the forward end thereof; a sprocket; a lower rail mounted on said track frame underneath thereof, said track frame has a front end terminating adjacent and below said idler and a rear end terminating adjacent and below said sprocket, both ends of said lower rail being upwardly curved; an endless track of linked together track shoes mounted around said idler, said sprocket and said lower rail; a front support rail mounted on said support member adjacent to said idler, said front support rail having a flat top surface and a downwardly inclined rear top surface to permit a smooth travel of said endless track when advancing the vehicle forwardly; and a rear support rail mounted on said track frame adjacent to said sprocket, said rear support rail having a flat top surface and a downwardly inclined front top surface to permit a smooth travel of said endless track when advancing the vehicle rearwardly.

The above and other objects, features and advantages of the present invention will be readily apparent from the following description taken in conjunction with the accompanying drawings.

DESCRIPTION OF THE PREFERRED EMBODIMENT

Figure 1:
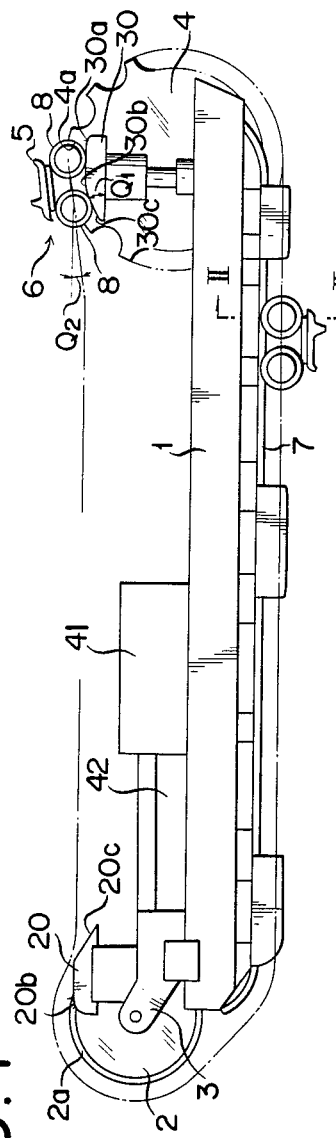
FIG. 1 is a schematic side elevational view of an undercarriage according to the present invention.

The present invention will now be described by way of example only with reference to the accompanying drawings.

Mounted on the front portion of a track frame 1 is an idler 2 which is biased forwardly by a recoil means 41. The central part of the idler 2 is rotatably mounted to a support member 3 which is attached to the front portion of the recoil means 41 and guided by the track frame 1 in such a manner as to be moved freely in the longitudinal direction. The recoil means 41 has a piston 42 slidably mounted therein and a spring for biasing the piston forwardly. Rotatably mounted on the rear portion of the track frame 1 is a sprocket 4.

A track link chain 6 comprised of a multiplicity of track shoes 5 connected in endless configuration extends around the idler 2 and the sprocket 4.

The track link chain 6 is provided with track rollers 8 spaced at equal pitches and kept in sliding contact with lower rails 7 mounted on the track frame 1.

Figure 2:
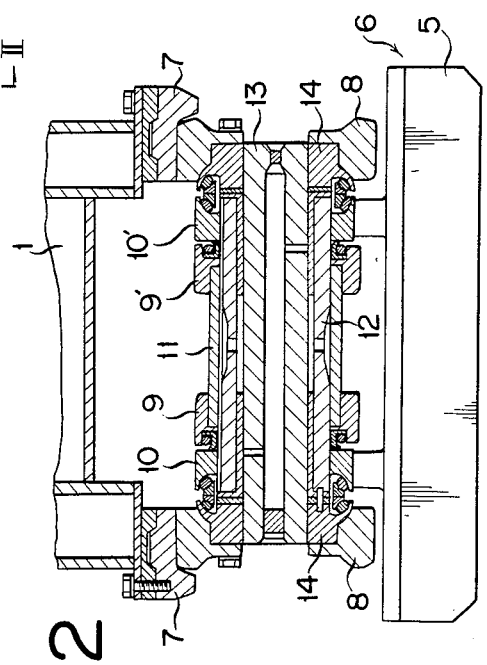
FIG. 2 is an enlarged cross-sectional view taken along the line II—II of FIG. 1.

Stating in brief, as shown in FIG. 2, both ends of a first bush 11 are fitted into inner side links 9, 9' fixedly secured to each track shoe 5, whilst both ends of a second bush 12 rotatably fitted into the first bush 11 are fitted into outer side links 10, 10'. Further, a pin 13 is rotatably fitted into the second bush 12. The pin 13 has collars 14 fixedly secured to both ends thereof. Each of the collars 14 has a roller 8 adapted to roll along the aforementioned lower rails 7, 7 and detachably fixedly secured thereto by means of bolts. The collars 14 are arranged to abut against both end faces of the second bush 12 thereby preventing the axial movement of the pin 13.

The idler 2 is held in rolling contact with the first bush 11 of each track link assembly and the sprocket 4 engages the first bush 11 for driving the track link chain.

Reference numeral 20 denotes front support rails mounted on the aforementioned support member 3. Each of the front support rail 20 comprises a curved front surface 20a mounted slightly lower than a top portion 2a of the idler 2, a flat surface 20b continuous with the curved front surface 20a and an inclined rear surface 20c which is continuous with the flat surface 20b.

Figure 3:
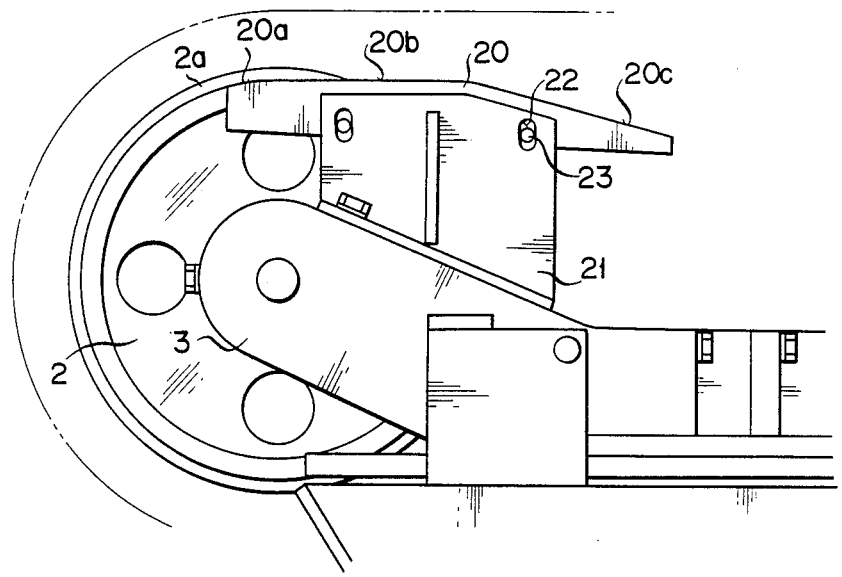
FIG. 3 is an enlarged side elevational view of a front portion of the undercarriage showing a front support rail in detail.

As shown in FIG. 3, each of the front support rails 20 is vertically movably attached through a long slot 22 and a bolt 23 to a bracket 21 fixedly secured to the support member 3 by means of bolts.

Reference numeral 30 denotes rear support rails each of which has a curved rear surface 30a, a flat surface 30b continuous with the curved rear surface 30a and an inclined surface 30c continuous with the flat surface 30b and which is inclined downwardly towards the front. The angle $Q_1$ of the inclined surface 30c relative to the horizontal plane has the following relationship with the catenary angle $Q_2$ of the track link chain 6.

$$Q_1 \geqq Q_2$$

Figure 4:
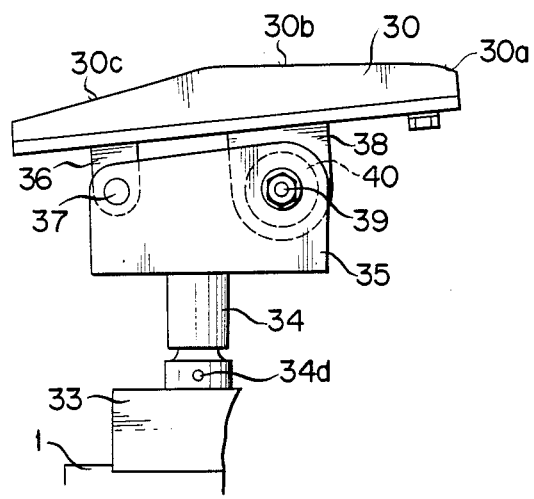
FIG. 4 is an enlarged side elevational view of a rear portion of the undercarriage showing a rear support rail in detail.
Figure 5:
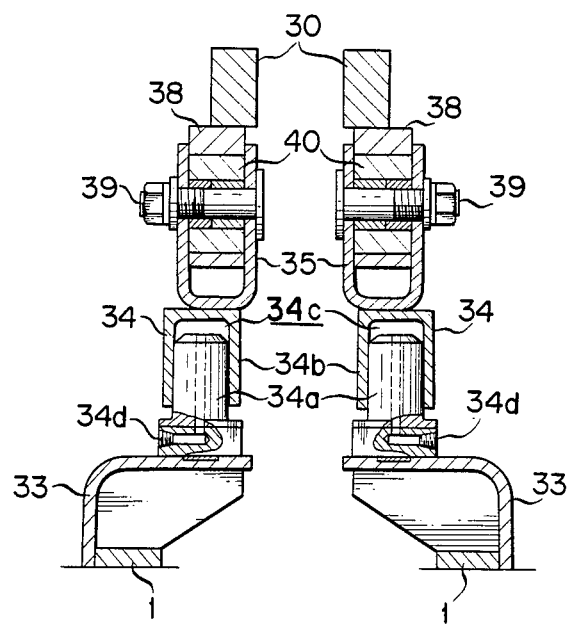
FIG. 5 is a longitudinal cross-sectional view of FIG. 4.

Further, the rear support rails 30 are fitted as shown in FIGS. 4 and 5. Stated briefly, U-shaped attachment members 35 are fitted through vertical adjusting means 34 to brackets 33 fixedly secured to the rear part of the track frame 1. The front portion of each of the rear support rails 30 is carried through a support lug 36 and a pin 37 by the front part of the attachment member 35 so as to allow the front part of the rail 30 to oscillate freely in the vertical direction. Further, rear support lugs 38 are resiliently carried through pins 39 and rubber bushes 40. This arrangement ensures that each of the rear support rails 30 is fitted to the track frame 1 so that it may be oscillated freely in the vertical direction and it may be biased upwards by the resilient force.

Each of the aforementioned vertical adjusting means 34 is constructed such that a fixed rod 34a is inserted into a movable cylinder 34b to form a grease chamber 34c which is filled with grease through an injection hole 34d and the injection of grease into the chamber 34c and discharge of it therefrom causes the movable cylinder 34b to move upwards and downwards. Thus, each of the track rollers 8 moves on and along the inclined surface 20c of the front support rail 20 and rides slowly on the flat surface 20b, and therefore no great shock noise will occur.

Further, when moving rearwardly, each of the rollers 8 moves along the inclined surface 30c of the rear support rail 30 and rides slowly on the flat surface 30b so as to have the first bush 11 engages the sprocket 4 so that no great shock noise will occur.

At that time, the rear support rails 30 will resiliently displace downwards against rubber bushes 40 thus ensuring that the occurrence of shock noise can be eliminated.

Further, because the rear support rails 30 are vertically movable, even if there is an error in attachment and manufacture or the rollers etc. have worn down, it can be compensated by adjusting the rails 30 vertically depending on the degree of the error and the wear.

Figure 6:
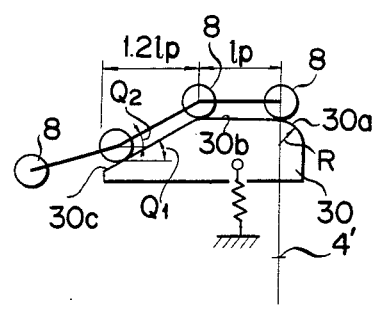
FIG. 6 is a schematic representation of the rear support rail showing relative dimensions thereof with respect to sprocket pitch.

Further, as shown in FIG. 6, the length of the flat surface 30b is approximately equal to a link pitch $l_p$ and the rear portion 30a of the flat surface is chamfered at a radius R smaller than that of the sprocket 4, and the length of the inclined surface 30c is equal to 1.2 $l_p$. Reference numeral 4' denotes the center of the sprocket 4.

As described hereinabove, according to the present invention, when the first bushes of the rollers 8 ride on the idler 2 and when they move rearwardly so as to engage the sprocket 4 no shock will occur, and therefore the noise level can be reduced remarkably.

What is claimed is:

1. A track-type vehicle undercarriage, comprising:
   (a) a track frame;
   (b) recoil means mounted on said track frame, said recoil means having a piston slidabley mounted therein and means for biasing said piston forwardly;
   (c) a support member fixedly connected at its rearward end to said piston;
   (d) an idler rotatably mounted on said support member at the forward end thereof;
   (e) a sprocket rotatably mounted on the rear of said track frame;
   (f) a lower rail mounted on said track frame underneath thereof, said track frame having a front end terminating adjacent and below said idler and a rear end terminating adjacent and below said sprocket, both ends of said lower rail being upwardly curved;
   (g) an endless track of linked together track shoes mounted around said idler, said sprocket and said lower rail;
   (h) a front support rail vertically, movably mounted on said support member adjacent to said idler, said front support rail having a flat top surface positioned slightly below the uppermost point of said idler and a downwardly inclined rear top surface to permit a smooth travel of said endless track when advancing the vehicle forwardly; and
   (i) a rear support rail resiliently mounted on said track frame adjacent to said sprocket, said rear support rail having a flat top surface positioned slightly below the uppermost point of said sprocket and a dowanwardly inclined front top surface to permit a smooth travel of said endless track when advancing the vehicle rearwardly.

2. A track-type vehicle undercarriage as recited in claim 1 wherein slanting angle of the downwardly inclined front top surface of said rear support rail relative to the horizontal plane is larger than or equal to the catenary angle of said endless track of linked together track shoes.

3. A track-type vehicle undercarriage as recited in claim 1 further comprising mounting means for mounting said rear support rail on said track frame, said mounting means including height adjusting means consisting of a fixed rod inserted into a movable cylinder to form a chamber which confines a viscous fluid and means for introducing viscous fluid into the chamber, and resilient attaching means.

* * * * *